United States Patent
Iftemi

(10) Patent No.: US 11,544,291 B2
(45) Date of Patent: Jan. 3, 2023

(54) PLATFORM AND METHOD FOR CONNECTING A BLOCKCHAIN ENGINE

(71) Applicant: INGENIUM BLOCKCHAIN TECH S R L, Slatina (RO)

(72) Inventor: Alin-Daniel Iftemi, Slatina (RO)

(73) Assignee: Ingenium Blockchain Tech SRL, Slatina (RO)

( * ) Notice: Subject to any disclaimer, the term of this patent is extended or adjusted under 35 U.S.C. 154(b) by 2 days.

(21) Appl. No.: 16/990,149

(22) Filed: Aug. 11, 2020

(65) Prior Publication Data

US 2021/0103603 A1 Apr. 8, 2021

(30) Foreign Application Priority Data

Aug. 14, 2019 (RO) .......................... RO20190000496

(51) Int. Cl.
| | |
|---|---|
| *G06F 16/27* | (2019.01) |
| *G06F 16/21* | (2019.01) |
| *H04L 9/32* | (2006.01) |
| *G06F 16/242* | (2019.01) |
| *H04L 9/00* | (2022.01) |

(52) U.S. Cl.
CPC .......... *G06F 16/278* (2019.01); *G06F 16/219* (2019.01); *G06F 16/2448* (2019.01); *H04L 9/3239* (2013.01); *H04L 9/50* (2022.05)

(58) Field of Classification Search
CPC .. G06F 16/278; G06F 16/219; G06F 16/2448; G06F 16/9024; H04L 9/3239; H04L 2209/38; H04L 9/12; H04L 9/3247
See application file for complete search history.

(56) References Cited

U.S. PATENT DOCUMENTS

| | | | |
|---|---|---|---|
| 2012/0089971 A1* | 4/2012 | Williams | G06F 8/61 717/167 |
| 2017/0041296 A1* | 2/2017 | Ford | G06F 16/951 |
| 2019/0122317 A1* | 4/2019 | Hunn | H04L 9/0637 |

(Continued)

OTHER PUBLICATIONS

Nathan et al., "Blockchain meets database: design and implementation of a blockchain relational database", Proceedings of the VLDB Endowment, vol. 12, Issue Jul. 11, 2019, pp. 1539-1552 https://doi.org/10.14778/3342263.3342632 (Year: 2019).*

*Primary Examiner* — Mark D Featherstone
*Assistant Examiner* — Kweku William Halm
(74) *Attorney, Agent, or Firm* — Banner & Witcoff, Ltd.

(57) ABSTRACT

The invention relates to a platform and a method of connecting a blockchain engine to a traditional database. The platform according to the invention is implemented in the form of a network of nodes, said network of nodes being divided into at least two subnets: a security subnet and a data subnet, all nodes in the security subnet containing information on security keys user licenses, operating licenses, access policies, and other information related to the licensing, authentication, and authorization mechanism of users accessing the platform, and where nodes in at least one data subnet comprise a software component that uses a network computer, an API communication interface that allows interaction with the computer network and retrieval of information to be saved in the storage system, a GraphQL data query interface, a data processing engine, a blockchain engine, a connection interface between the data processing and blockchain engine, and a database.

25 Claims, 8 Drawing Sheets

(56) References Cited

U.S. PATENT DOCUMENTS

| | | | |
|---|---|---|---|
| 2020/0005292 A1* | 1/2020 | Mao | H04L 9/3247 |
| 2020/0366489 A1* | 11/2020 | Assenmacher | H04L 9/3239 |
| 2021/0182423 A1* | 6/2021 | Padmanabhan | G06F 21/64 |

* cited by examiner

| 95 | |
|---|---|
| ◈ | Node in the subnet |
| ■ | External systems that can connect with HyperFiuse. |
| ◐ | The HyperFiuse administration interface through which the administrator configures the system |

PLATFORM AND METHOD FOR CONNECTING A BLOCKCHAIN ENGINE

The invention relates to a platform and a connection method intended to connect a blockchain engine with at least one traditional database.

BACKGROUND

A blockchain is a list of ever-growing records (or data) called blocks that are linked and secured using cryptography. As a data structure, a blockchain is a simple chained list, in which the links between elements are made by hash (hash function). Thus, each block usually contains a link to a previous block (a hash of the previous block), a timestamp, and transaction data. By design, blockchains are resistant to data modification. The blockchain is "a transparent and distributed registry that can record transactions between two parties efficiently, verifiably and permanently". To be used as a distributed registry, a blockchain is usually managed by a collective peer-to-peer network, which adheres to a protocol for validating new blocks. Once recorded, the data in any data block cannot be changed retroactively without altering the following blocks, which requires the majority consent of the network participants.

Blockchains are secure by design and are an example of a distributed computer system with high Byzantine-type tolerance (tolerance to attackers or uncooperative computers). The problem of decentralized consensus has therefore been solved with the help of the blockchain technology. This makes blockchain technology suitable for recording events, medical records as well as recording other management activities such as identity management, transaction processing, source documentation, food route tracking or voting systems.

The first public blockchain was conceptualized in 2008 by an anonymous person who identified himself as Satoshi Nakamoto. In 2009 it was implemented in the Bitcoin cryptocurrency, where it serves as a public and decentralized register for all transactions. The invention of blockchain technology made Bitcoin the first digital currency to solve the problem of double spending without the use of a trusted central authority or central servers. The design of Bitcoin has been a source of inspiration for many other applications.

Blockchain technology stood out by a number of technical and conceptual benefits that are proving to have a very large impact in terms of governing the parties' interaction with software products and the security of the data they operate. These include:

Data immutability: due to the structure of logically dependent data blocks by hash type signatures, resistance to data modification is one of the main characteristics that blockchain technology brings to the level of security and protection of stored data Decentralization: the removal of a central government of data and users who access an application based on blockchain technology. The data is stored in a system accessible to all parties and users can access it directly in the personal node, based on the rules and security policies to which they have submitted. This feature increases user trust in how the system manages data and protects user privacy.

Distributivity: the system scalability is guaranteed by the presence of several nodes, where each of the nodes contains a complete copy of the data (blockchain) as well as the computer program that facilitates access to such data. Distributed systems are not an innovation of blockchain technology, they have existed for a very long time, but the technology is differentiated by the sum of several existing technologies that together create an innovative technology, not necessarily by the benefits of each component.

Security: data protection (encryption/decryption), but also block-embedded cryptographic algorithms for signing transactions provide a high level of data security that not only guarantees their protection through encryption but also guarantees the authentication, authenticity, their integrity and non-repudiation.

The Bitcoin application has aroused the interest of technology communities through its robustness, resistance to cyber-attacks, and the security with which it manages to operate without being governed by an entity. The blockchain technology that underlies the Bitcoin application has become extremely appetizing, and it has been proven that the benefits it offers can also be used at in industrial software applications.

SUMMARY

The present invention aims to provide a platform and a connection method that allows the implementation of blockchain technology in the software solutions that they develop or have already developed.

Another object of the invention is to facilitate the adoption of blockchain at the industrial level, by combining blockchain technology with traditional data storage mechanisms (database engines).

According to the present invention, the connection platform is intended to connect a blockchain engine with a traditional database, the platform being implemented as a network of nodes, the said network of nodes being divided into at least two subnets: a security subnet and a data subnet, all nodes in the security subnet containing information on users' security keys, operating licenses, access policies, and other information related to the security mechanism, licensing, authentication, and authorization of users accessing the platform, and in which nodes in at least one data subnet comprise a software component that uses a computer network, an API communication interface that allows interaction with the computer network, and retrieval of information saved in the storage system, a GraphQL data query interface, a data processing engine, a blockchain engine, a connection interface between the data processing engine and the blockchain engine, and a database.

Other preferred features of the platform according to the present invention are set out in dependent claims 2-11.

The objects of the invention are further achieved by means of a method of connecting a blockchain engine with at least one database management engine; the method comprises the steps of providing a connection platform according to claim 1, said platform being implemented under the form of a network of nodes divided into at least two subnets: a security subnet and a data subnet, all nodes under the security network containing information on users' security keys, operating licenses, access policies, and other information related to the licensing, authentication and authorization mechanism of users accessing the platform, and in which the nodes of such at least one data subnet comprise a software component that uses a computer network, an API communication interface that allows interaction with the network computers and retrieving the information to be saved in the system storage, a GraphQL data query interface, a data processing engine, a blockchain engine, a connection interface between the data processing engine and the blockchain engine, and a database.

Other preferred features of the platform according to the present invention are set out in dependent claims 13-24.

Other objects, features and advantages of the present invention will become more apparent from the following detailed description of preferred embodiments of the invention, given in connection with the accompanying Figures, which show schematically and not exhaustively the concepts of the present invention, and in which:

DETAILED DESCRIPTION

Figure 1:
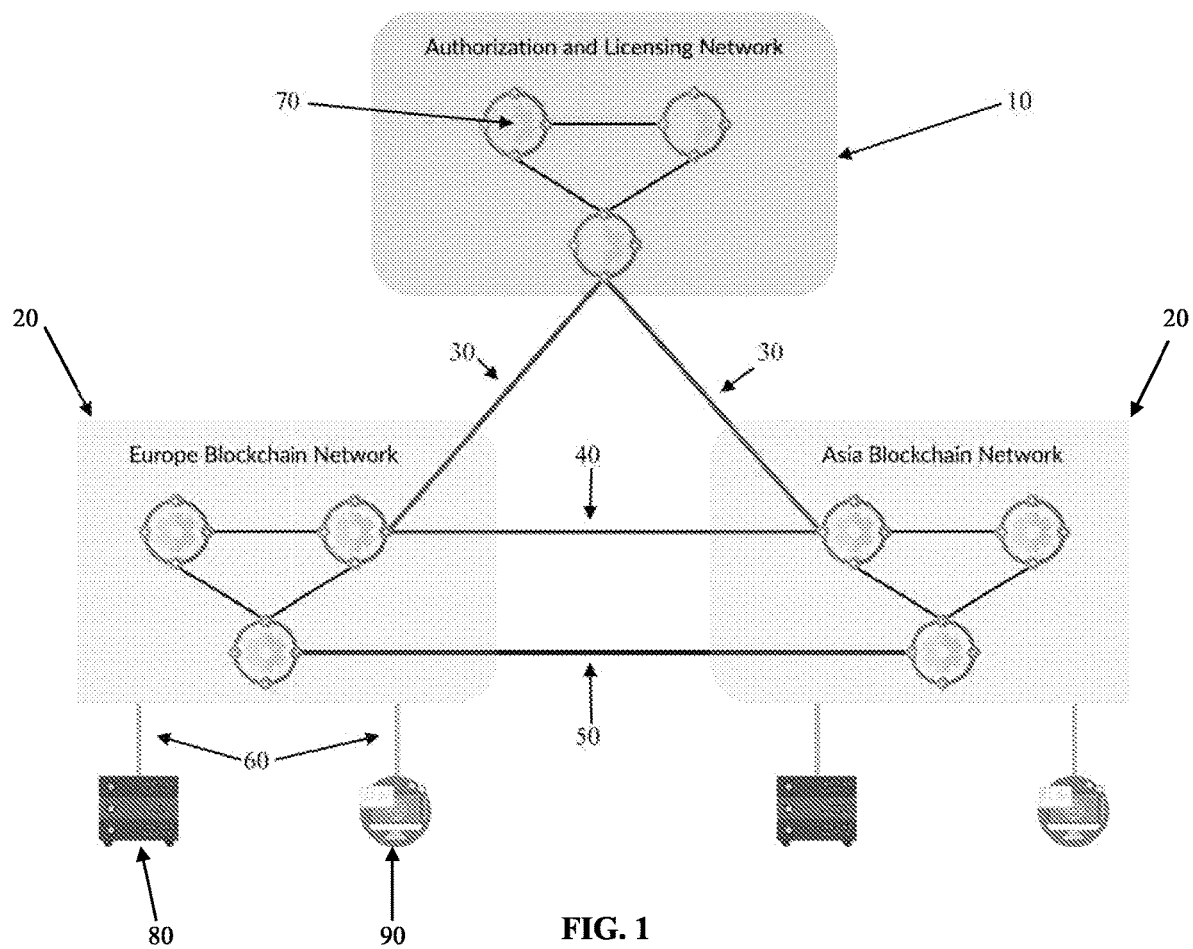
FIG. 1: is a schematic diagram of the implementation of the platform nodes according to the present invention.

With reference to the accompanying Figures, the platform according to the present invention is a connection platform, an intermediation platform, which connects a blockchain engine (e.g.: Ethereum, Hyperledger) with a traditional database (e.g.: MongoDb, Oracle, MsSq1). This (hybrid) connection is enhanced with a set of properties, benefits and functionalities that aim to facilitate the adoption by programmers but also to facilitate their work in terms of developing decentralized applications with a high level of data security.

The platform according to the present invention is easily accessible via the API (Application Programming Interface/Drivers), as most programmers are accustomed to interacting with existing data storage mechanisms.

In architectural terms the platform according to the present invention (the platform according to the present invention may also be referred to herein as HyperFiuse, it being understood that this name does not limit in any way the characteristics and scope of the invention) has the form of a computer network (also called nodes). This computer network is grouped into subnets, requiring at least two subnets to create an infrastructure: the security subnet and the data subnet. In turn, the data subnet can be divided into several subnets, depending on geographic areas or other logical groupings convenient to the system administrator.

Each subnet contains one or more nodes, the type of subnet being given by the type of data stored on the nodes that form it. In the security subnet, all nodes contain information about users' security keys, operating licenses, access policies, and other information related to the licensing, authentication, and authorization mechanism of users accessing the system.

The authentication and authorization mechanism used in public blockchain engines (see Bitcoin/Ethereum) is based on public/private key pairs, but the private key is held by the user. It is well known that the loss of a private key makes it impossible to decrypt the information that was encrypted with the public key associated with it. If the rules in public blockchain applications are very clear from the beginning and each user assumes the retention of the private key, things are completely different in the business environment. Due to the high risk of losing a decryption key in the business environment, a security subnet has been created that will store this information for users. I point out that the system can also work by completely decentralizing users and their associated keys, in one of the following cases:

The beneficiary assumes that the users keep the keys in their own custody

An external provider is connected to maintain user keys

Hardware keys are used for users accessing the application

Complete decentralization and moving user keys to their custody does not remove the need for the security subnet. This also contains, for example, access policies to the data subnet, which will always be saved in the security subnet. The security subnet will be managed by the main beneficiary of the infrastructure, but it can also be managed by several parties, this being at the disposal of the beneficiary.

The data subnet actually contains the data nodes that are the purpose of the software product. Multiple data subnets are created because they can be configured separately by the system administrator so that certain data subnets can only receive connections from certain IP addresses. Also, certain subnets may be configured not to allow synchronization of certain data in nodes in other data subnets. Example: one can configure a certain entity (table), to synchronize only with nodes inside the subnet in which it is located.

With reference to FIG. 1, the following shows an authorization and licensing network (10) that includes security subnet (shaded rectangle pointed to by the arrow labeled 10) having at least one node (70). Following is a user communication channel for authorization and authentication (30) which as shown communicates to respective Data subnets (20) associated by or with a channel for data communication and synchronization between subnets (40). The node in said subnet further being in communication with other subnet by a second channel for data communication and synchronization between nodes (50). As provided in FIG. 1, the respective data subnets (20) may connect via API—programmers communication interface (60) with external systems (80) that connect with HyperFiuse and/or a HyperFiuse administration interface (90) through which the administrator configures the system. With further reference to FIG. 1, reference 95 that indicates characteristics depicted in FIG. 1.

Figure 2:
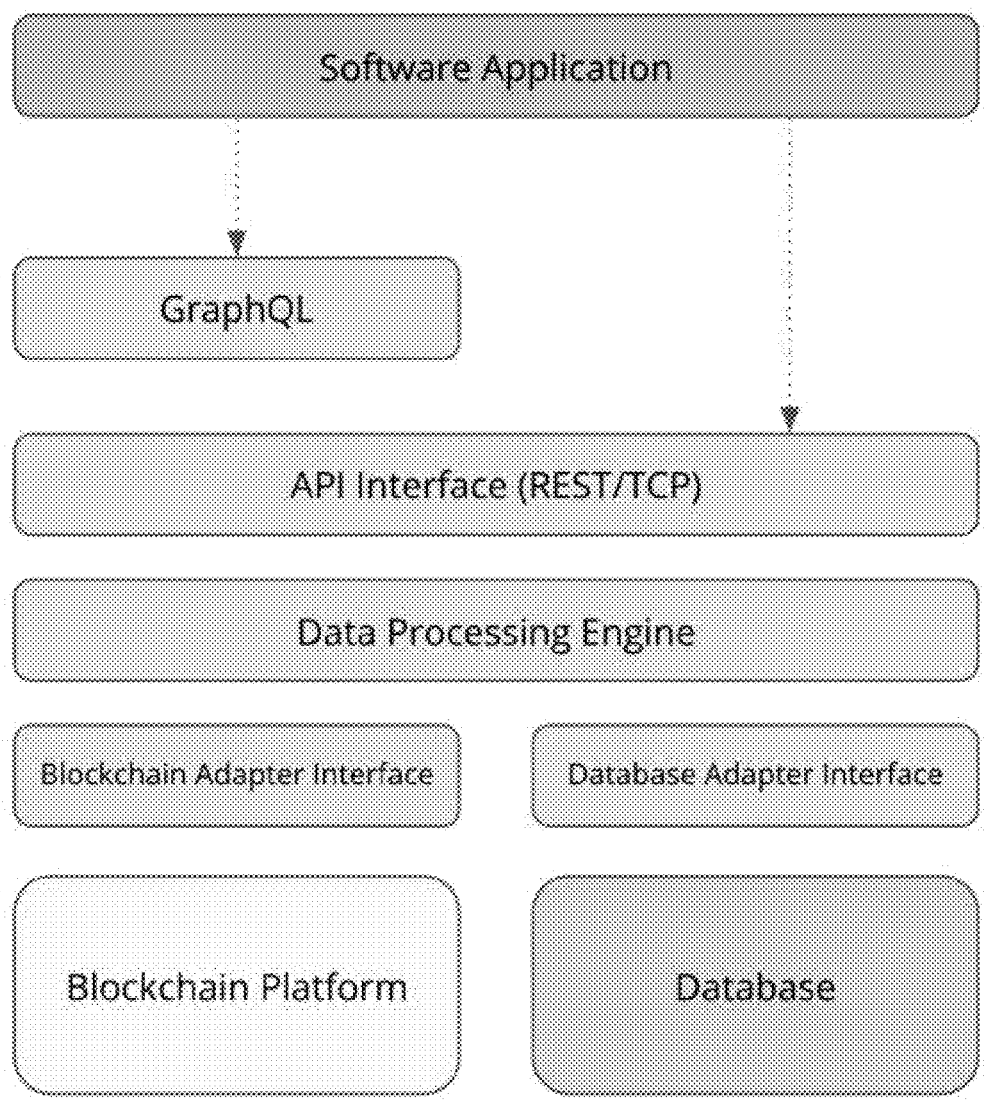
FIG. 2 is a schematic diagram of the structure of a platform node according to the present invention.

With reference to FIG. 2, showing a flow chart, the Software application includes a software component that uses the HyperFiuse platform which leads to the GraphQL interface and/or API interface. As further explained, the API Interface comprises a communication interface, which allows the programmer to interact with the HyperFiuse platform. The API interface features communication connectors that use HTTP (REST). And, the GraphQL comprises a data query interface. The API interface allows interaction with data in the CRUD system (Create, Read, Update, Delete). The GraphQl interface is used for more complex data query mechanisms. This component is also dedicated to programmers as data access tool. With regards to the data processing engine, it is a HyperFiuse engine. All functionality that is part of the HyperFiuse product is concentrated in this component. Each functionality will be explained in detail in the following chapters. The Blockchain adapter interface is understood as a connection interface between the HyperFiuse engine and the blockchain engine. This component allows the inter-change of the blockchain engine with any blockchain engine preferred by the beneficiary and allows HyperFiuse to be an agnostic platform in this respect. The Blockchain Platform/Engine comprises Blockchain engine such as Hyperledger Fabric, Tendermint, Ethereum and so on. And, the Database adapter interface refers to connection interface between the HyperFiuse engine and the database engine. This component allows the interchange of the database engine with any blockchain engine preferred by the beneficiary and allows HyperFiuse to be an agnostic platform in this respect. The Database refers to and may include Database engines such as Oracle, MongoDb, MsSQL and so on. References to the foregoing may be further implicated to support further explanations hereto.

3.3.1 Data Storage Mechanism

The platform according to the present invention (HyperFiuse) can also be called a software product connecting a blockchain engine (HyperLedger, Tendermint, Ethereum etc.) with a database management engine (MongoDb, MsSq1, Oracle etc.), allowing programmers to communicate with a single system, which in turn will deal with data storage in both connected components (blockchain and database), as well as with the synchronization of data stored on all data nodes that make up the network.

The basic mechanism consists of retrieving the information to be saved in the storage system, calculating a fingerprint of the retrieved information using hashing algorithms, saving the retrieved data in the database engine, and the fingerprint, together with the location reference data (the table/collection in the database and the unique identifier of the data in the table/collection) in the blockchain engine.

Figure 3A:
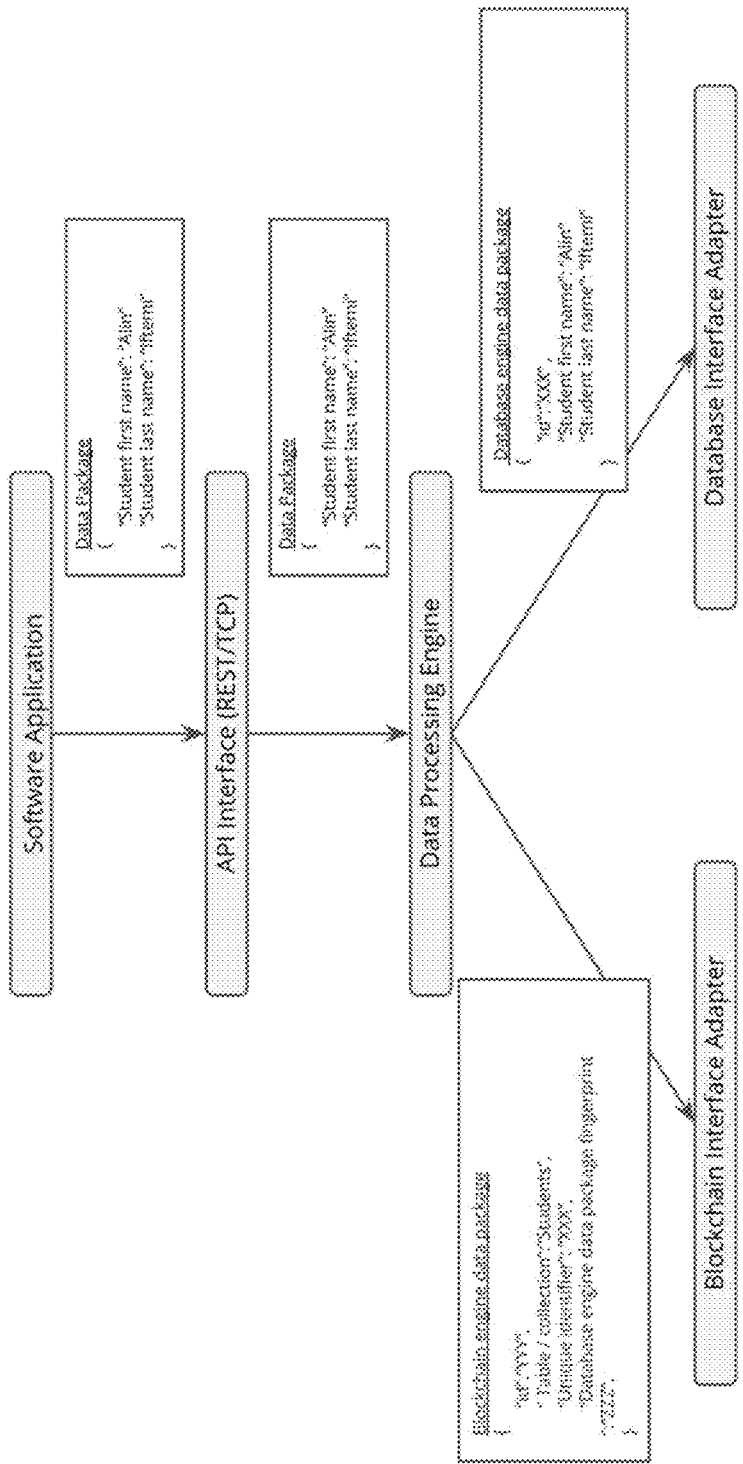
FIG. 3*a* is a sample diagram for the data storage mechanism.
Figure 3B:
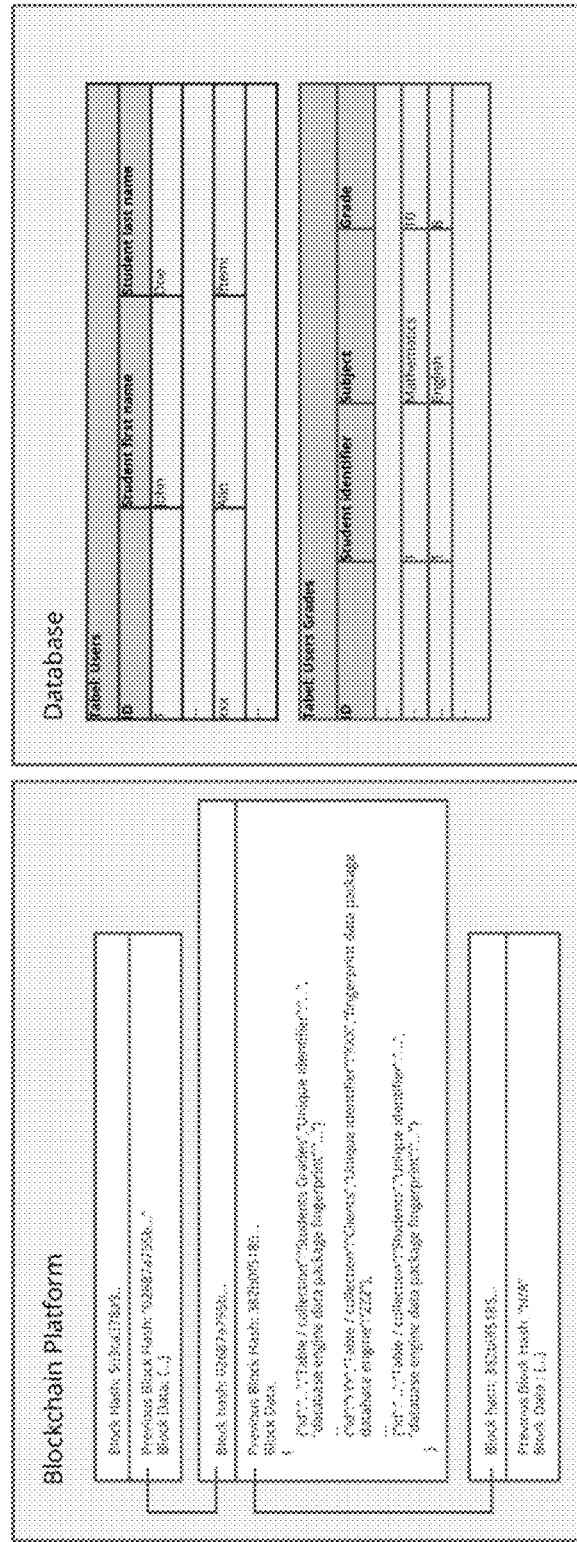
FIG. 3*b* is the continuation of the sample diagram for the data storage mechanism shown in FIG. 3*a;*

The first step in the data storage process is to retrieve the data. This process is done with the help of the API interface, through which the software application sends the information to be stored in the system blockchain database. As shown in FIGS. 3a and 3b, diagrams for the Data storage mechanism, the software application sends a data packet of the form {"student first name":"Alin", "student last name": "Iftemi"}.": The data format sent differs depending on the entity/table in which the information is to be stored, its structure being defined in advance through the API methods exposed in the API Interface component, or through the HyperFiuse system administration application.

The second step is the HyperFiuse engine taking over the data to be validated and saved in the database or saved in the blockchain (the mechanism of immutable blocks). The standard, initial configuration requires that each data structure that is sent for saving be stored in the database, and on the blockchain to be saved a reference to the location of the data in the database (Table/collection and unique record identifier) such as and a fingerprint of this information.

For the example presented in the Data storage mechanism figure, the information taken over by the HyperFiuse data processing engine, namely {"student first name": "Alin", "student last name": "Iftemi" }, it is divided into two data sets, one for each storage component, database and blockchain (the blocks of immutable data in the blockchain engine).

In this way, the form of the information stored in the database is presented in the following structure {"id": "XXX", "student first name":"Alin", "student last name": "Iftemi" }. The "id" field in the presented structure refers to the unique identifier that was obtained after saving. In this example, the value "XXX" can be any unique identifier associated with the information saved by the database engine. Each data sent for storage is directed to the table/collection associated with it in the database management system (database engine).

After saving the information in the database, the fingerprint of the saved record is calculated using a hashing method/function (MD5, SHA256, SHA512). The system can use any hashing method agreed by the administrator, its selection being made based on a configurable parameter of HyperFiuse. The fingerprint, together with the name of the table in the database management system where the data was saved, and the unique identifier of the record, are grouped in a new data set of the form {"id": "YYY", "Table/collection": "Students", "unique identifier": "XXX", "database engine data package fingerprint":"ZZZ" } and is sent for saving in the blockchain (blockchain engine); The "id" field is the unique identifier of the transaction associated by the blockchain engine, where using the value "YYY" any value given by such a system may be represented. In this way, a link is created between the information saved in the database and the information saved in the blockchain, the connection point being the name of the table in which the data was saved and the unique identifier of the table registration.

The structure of the table, entity, or collection in which the information is saved is defined by the system administrator in advance, using the API or web application to configure the information. The data structure used as an example in this document aims to present the concept of data storage and the connection between blockchain systems and database systems. In the production system, these structures can differ by the number of fields or the field names; the variants presented above are only used for explained and educational purpose. Fields in the blockchain engine such as: the node where the record was saved, the date/time when a record was made and other fields, were omitted precisely to stress the system operation mechanism easier and more clearly.

The procedure described is similar for deleting data. Database-level write operations can be of three types: insertion, modification, and deletion. Each operation is stored in the blockchain as an independent transaction along with reference information such as the table, record identifier and fingerprint. Virtually every data modification operation is saved as a blockchain transaction and all operations are kept intact throughout the life of the application. At the database level, operations can change the data according to the type of transaction required by the software application (programmer): create, modify or delete. The table/collection in the database associated with the data structure on which changes are made, permanently keeps the latest version of the data but for each table/collection there is the corresponding table/collection that keeps all previous versions of the traded record.

This mechanism is created to keep an immutable history of operations (blockchain) but also the full version of the data and their history. HyperFiuse can be configured not to keep the history of the modified data, or to delete this history for certain records. This functionality is useful for meeting the legal requirements laid down by the GDPR, and the parameterization of these operations can be done only for the tables/collections selected by the system administrator and at his initiative.

3.3.2 Data Distribution Mechanism

HyperFiuse comes in the form of a network of nodes, and data distribution/synchronization is the main functionality for its system to provide scalability, decentralization and resistance to data change. The HyperFiuse data network can be composed of several subnets (see Chapter 3.2), and each data subnet contains several nodes. Each node contains a full copy of the data in the blockchain (immutable transaction reference blocks) as well as a copy of the database (see Chapter 3.3). When saving a data set, the operation type, reference and fingerprint are saved in the blockchain and the data is directed to the database where it is stored in the corresponding tables/collections (see Chapter 3.3.1).

Once the data is sent to the blockchain engine, it begins to synchronize with the other instances installed on the data nodes, using the consensus algorithms that were configured during installation. The blockchain engine synchronization process also deals with the creation of transaction blocks (records); this functionality is entirely specific to the blockchain engine, and the synchronization efficiency as well as the synchronization speed is strictly dependent on the configurations and the blockchain engine chosen by the beneficiary. HyperFiuse integrates blockchain engines according to the beneficiary's preference and does not intervene in their synchronization mechanisms.

Blockchain data is distributed on absolutely all nodes in all data subnets, under the authority of the blockchain engine, but the data in the database is synchronized by the HyperFiuse system. Each node in the data subnet is updated in the blockchain with the most recently validated blocks by the blockchain engine, and once a new block is synchronized, the HyperFiuse system processes each transaction in the block and for each of them initiates a request to obtain the modified data to the issuing node where the transaction was created. Once the data is received, it is also modified in the database of the recipient node according to the type of transaction specified in the blockchain Their modification refers to any of the data alteration operations: creation, modification and deletion as well as to the creation of the history of the traded record.

The time and speed of data synchronization in the blockchain is directly dependent on the blockchain engine used (HyperLedger, Tendermint, Ethereum, etc.), and it is up to the beneficiary to choose a convenient blockchain engine depending on the type of activity of the software served by HyperFiuse. In general, blockchain engines for industrial applications are optimized for performance, nevertheless can be differentiated by the speed or synchronization algorithm, configurations and how to store data in the immutable chain or by commercial functionality. Hyperfiuse is independent of the blockchain engine, and several distributions are available for the beneficiary to choose the most convenient distribution, both in terms of blockchain engine and database engine. More details about independence from engine blockchain in Chapter 3.3.4.

3.3.3 Data Reading Mechanism

Access to data provided by HyperFiuse is done in two ways: direct access to the database and access through the API.

Direct access to the database refers to the publication of the details of direct connection to the database engine. This type of connection is used in case the software application uses complex queries based on T-SQL or quick readings from the database, readings with response time assumed by the database engine are wanted. The software application connects directly to the database to perform readings and in the case of a rapid migration, from an infrastructure based on classic database management systems to an infrastructure based on HyperFiuse blockchain database, when there may be situations when not the source code modification was completed to read through HyperFiuse, which will be done later.

There are also disadvantages to this type of reading, namely that the data that has been encrypted in the system cannot be obtained automatically, the decryption will have to be done manually by the programmer (see Chapter 3.3.8). Also, the data will not be filtered according to the users' access rights over them (see Chapter 3.3.11). In API read operations, data decryption is done automatically and according to the user's rights over the data.

The recommended method is to access the records through the API. HyperFiuse will return the information requested by the programmer from the Software Application, and it will be delivered to him taking into account all the configurations and functionality filters of HyperFiuse. Specifically, the reading through API will return the data in readable format (decrypted), will filter the data according to the rights that the user performing the reading has over them, will perform data integrity checks and will allow reading with the option to reconstruct data if unauthorized changes/ deletions have been identified. Also, through the API, operations to read previous versions of a record can be performed very easily and efficiently. All these benefits are described in the following chapters and are not available when reading information directly from the database management system.

The data reading speed through the API is the same as the reading speed directly from the database, plus (where appropriate) the time of decryption, the time of checking the data integrity, the time of reconstruction of a record and filtering the data to which the reading user has access. All these additional operations bring a minor delay to a read operation, a delay that would have occurred anyway when the programmer would have decided to implement these functionalities in the software application. Also, all these benefits offered by HyperFiuse that add to the read time are optional at the discretion of the system administrator and programmer.

3.3.4 Independence from the Blockchain Engine

HyperFiuse uses the blockchain component, the blockchain engine, to synchronize data blocks with transactions, references to operated data and their fingerprint, as well as to keep an immutable history of all operations on the data. The entire blockchain engine data block set is used by HyperFiuse to reconstruct and synchronize data from the database engine.

Blockchain technology is at the beginning of the road, one blockchain engine is not yet differentiated at the expense of another and there is a lot of experimentation in terms of consensus algorithms and synchronization speed. There are already many software manufacturers that have considerably evolved in terms of research and development in the field of blockchain engines, and that have launched reliable products, but the technology is still in its infancy.

Due to the fact that there are several manufacturers of blockchain engines, and the needs of customers/beneficiaries can also consider this aspect, HyperFiuse presents itself as a platform independent of this component. This means that HyperFiuse can also work with HyperLedger Fabric (blockchain engine), and with Tendermint and any blockchain engine the application beneficiary wants. HyperFiuse will be distributed to the beneficiary with a combination of blockchain engine and database engine at his request or will be distributed in downloadable form on the company's website, being up to the developer to create as diverse a distribution as possible to cover the needs of all beneficiaries.

3.3.5 Independence from the Database Engine

Each HyperFiuse node also contains a database management system, the database engine. This component is used to fully store records and data saved in the system as well as to preserve previous versions.

It is well known that certain beneficiaries depend on certain manufacturers/suppliers of database management systems, and since HyperFiuse was created to offer the possibility of migrating existing software applications in blockchain technology, it has become imperative that this component, the database engine, can be changed according to the beneficiary's preference.

Due to the fact that there are several manufacturers of database engines, and the customers/beneficiaries' needs can also consider this, HyperFiuse is a platform independent of this component. This means that HyperFiuse can also work with Oracle (database engine), and with MongoDb and any database engine the application beneficiary might want. HyperFiuse will be distributed to the beneficiary with a combination of blockchain engine and database engine at his request or will be distributed in downloadable form on the company's website, being up to the developer to create as diverse a distribution as possible to cover the needs of all beneficiaries.

3.3.6 Data Synchronization Policies

As described in Chapter 3.2, the data subnets can be configured to limit the timing of certain data tables/collection nodes in the subnet. Data synchronization policies apply at the subnet level, where for each data subnet it is possible to specify which table/data collection should not be synchronized with nodes outside the subnet.

Data synchronization policies also allow the restriction of data provision requests addressed to nodes in the subnet through the API. This restriction is made at the IP address level, and once such a restriction policy is defined, it can only communicate with the API by Software Applications that are within an IP margin compliant with the data subnet configuration.

A data subnet that has no data synchronization policy defined is called OPEN NETWORK, and a data subnet that has at least one rule defined in a data synchronization policy is called a RESTRICTED NETWORK.

An example of a scenario in which a restrictive policy on data synchronization would make sense is if China does not allow the transfer of personal documents stored in electronic format to leave the country's physical borders. If a Chinese beneficiary were operating in China and Korea, and there were no such restrictions in Korea, then the HyperFiuse data network could be divided into two sub-data networks, one in China and one in Korea. For the subnet in China we will create a data synchronization policy that will include the "Documents" table as a table/collection that is not allowed to synchronize data in other subnets and we will add in the synchronization policy a blocking rule for access requests from any non-Chinese IP. (it should be noted that the electronic download of a document accessed from a browser in Europe is also considered a breach resulting in an illegality; therefore, access to the API needs to be limited on the nodes in the subnet). Restrictions on data synchronization may apply both to data coming from a certain subnet and to data coming from other subnets; also, these restrictions apply at the table/collection level in the data subnet.

Figure 4:
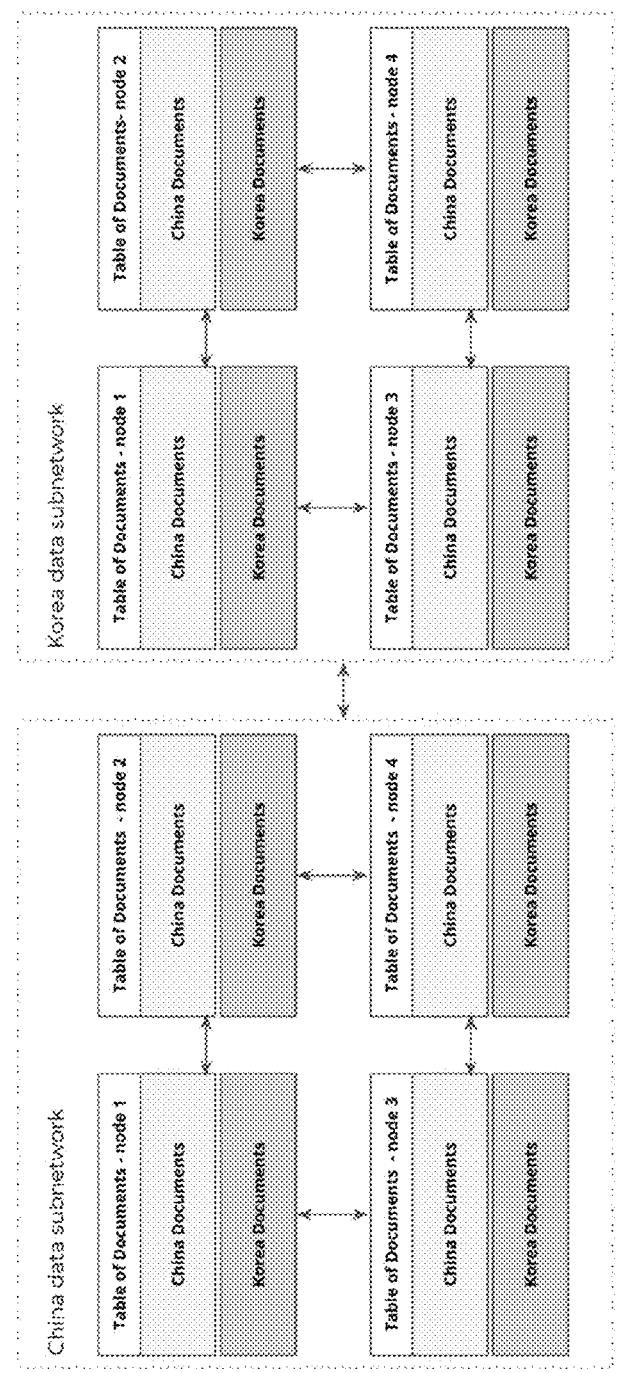
FIG. 4 is an illustrative diagram of an open network.
Figure 5:
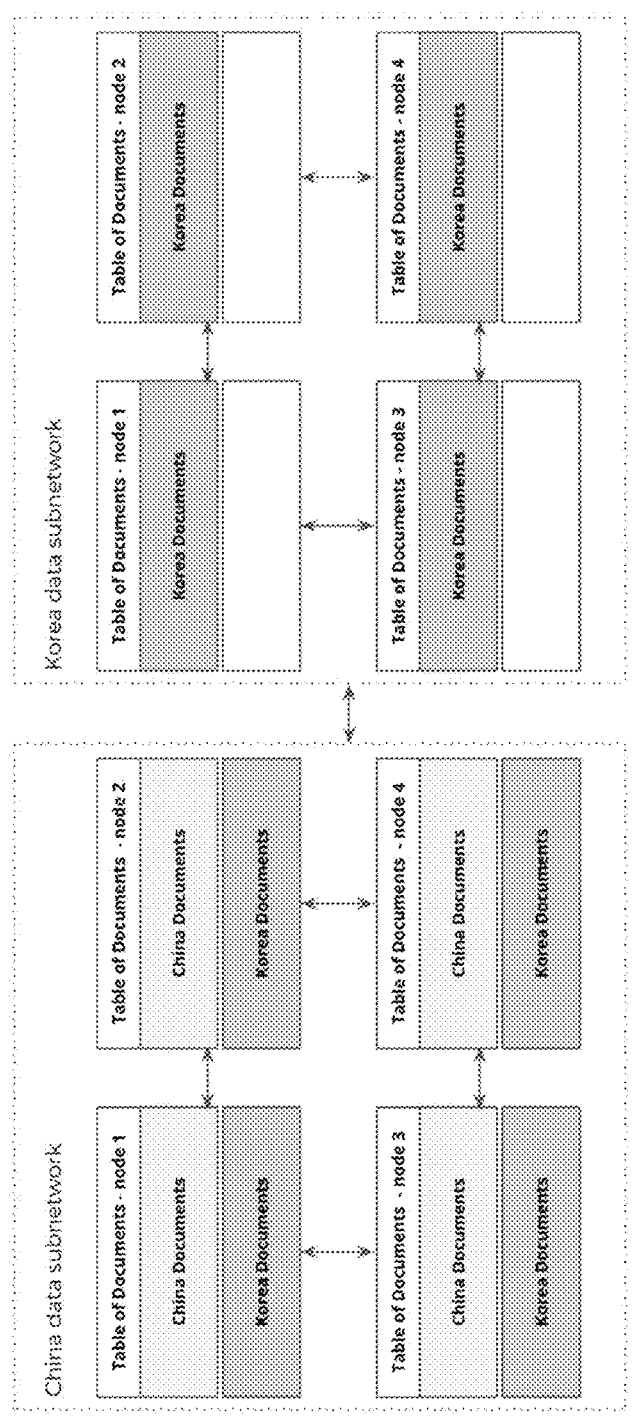
FIG. 5 is an illustrative diagram of a restricted network (1)
Figure 6:
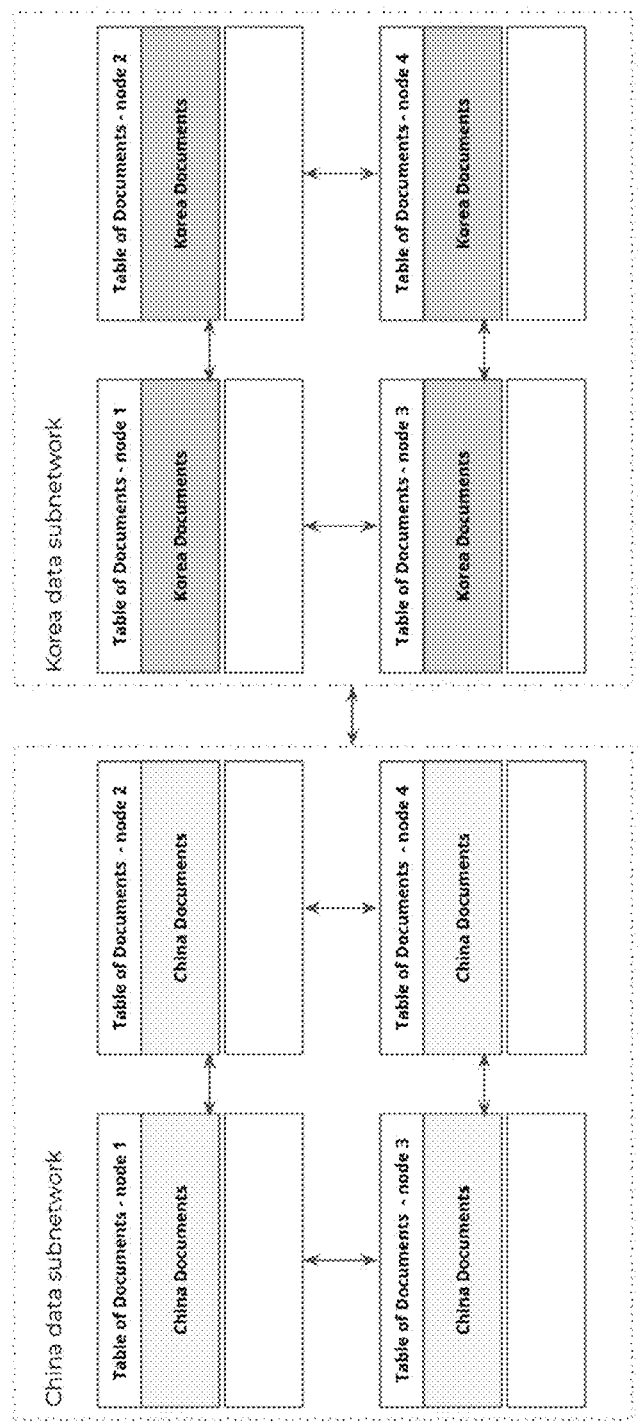
FIG. 6 is an illustrative diagram of a restricted network (2)

The following scenarios are defined in the attached FIGS. 4-6:

FIG. 4 Open Network—example of a network in which no restrictions have been defined at the table/"Documents" collection level. It is a classic scenario, in which no restrictions are defined but subnets are defined to keep the option open in the future. Although there is no difference between having a network not divided into subnets and dividing the network into two OPEN_NETWORK subnets (no restrictions), it is advisable to divide into subnets logically, for possible configurations or limitations that may occur in production that require rapid implementations.

FIG. 5 Restricted Network 1—example of a network in which a restriction rule has been defined on the Documents table in the China subnet so that the data entered through the nodes in the China subnet can only be synchronized in the China subnet and not allow synchronization with nodes in external subnets. However, the rule allows the table to receive records from other data subnets FIG. 6. Restricted Network 2—an example of a network in which a restriction rule has been defined on the Documents table in the China subnet so that data entered through nodes in the China subnet can only be synchronized in the China subnet, and not to allow synchronization with nodes in external subnets. The rule does NOT allow the table to receive records from other data subnets either. The same effect would have been obtained if both subnets had restricted the "Documents" table to data transmission only. In both variants there are no differences in the level in which the data is distributed, but the way of synchronization would have been different if we had introduced another subnet.

3.3.7 Data Storage Policies

HyperFiuse is a distributed network of nodes, where each node retains a complete copy, a replica, of the database. Indeterminate multiplication of nodes, respectively the entire data set in the database, can create logic and infrastructure problems. It does not always make sense for a node, in the maintenance of a part, to contain all the data in the system just as it does not make sense to maintain too many nodes with all the data, from a technical perspective of the consumption of hardware resources. To resolve this issue, HyperFiuse allows the configuration of a node so that it does not synchronize all data, and only store data that has been saved using the API installed on that node.

In this way, a node in the HyperFiuse network can be a node that stores all the data in the system, and such a node is called a FULL NODE. These nodes are usually hosted at headquarters or in a data center owned by the beneficiary and can serve as a source for data recovery or as a real-time backup tool. The goal is to protect business nodes from partners or subsidiaries from maintenance of large volumes of data with expensive hardware. The functionality is optional, and it is possible without any problems, depending on the purpose, for all nodes in a network or subnet to function as a FULL NODE.

A node can operate without synchronizing all data that is saved across the network, retaining only the data that was entered using the node's API. These nodes will only store in the database the data that was entered through the API of the node in question. This process does not restrict access to other data entered through other nodes, which are replicated when requested by the user. Once copied, following a request, the data brought will remain on the partial node forever. The purpose of this functionality is to provide the possibility for a software to communicate with a data node maintained in a business environment, such as a branch or a small office, without the need for a complex hardware infrastructure installed on site, but also to avoid synchronizing certain data belonging to other parties on the local database. HyperFiuse can serve as a data storage solution, software applications that are operated by several third parties who are very interested that the data they enter into the system is not exposed to other parties operating the system. Even if this data can be encrypted, greater security is induced when, although encrypted, the data is not accessible to other parties at all. These nodes are called PARTIAL NODES.

Figure 7:
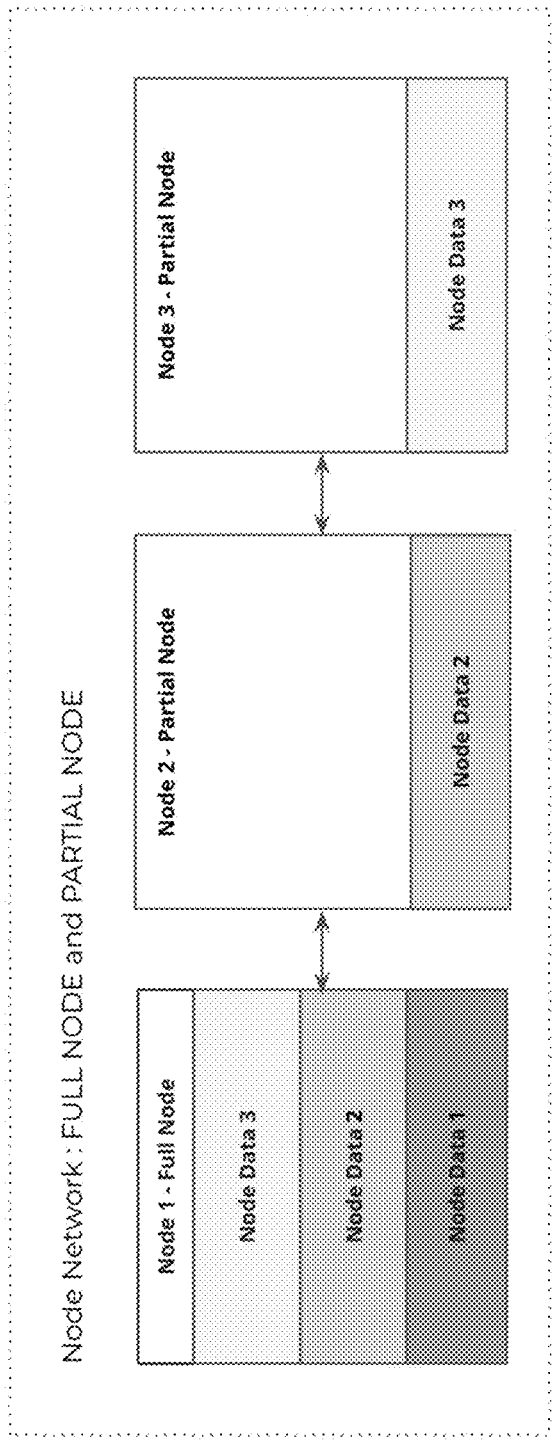
FIG. 7 is a sample network diagram with a FULL NODE node and 2 PARTIAL NODE nodes.

A PRIVATE node is another type of node, which not only does not locally copy data that has been entered through the API of other nodes, but also does not allow data entered through its own API to be synchronized to other nodes. FIG. 7 shows a representation of a network with a FULL NODE and 2 PARTIAL NODES 3.3.8 Data Encryption Data encryption is used in HyperFiuse to improve the protection and security of data stored in the database component, and to allow the beneficiary to hide certain sensitive information in case of unauthorized data extraction but also to give system users the opportunity to become owners of data not only in conceptual terms but also in physical terms, such data owned by the user being encrypted with his private key.

Encryption mechanisms are based on asymmetric encryption algorithms, which use a key pair consisting of public key for encryption and private key for decryption. The mechanism of operation of this encryption mode is not explained in this document, but more information can be obtained here https://en.wikipedia.org/wiki/Public-key cryptography HyperFiuse uses two entities that can encrypt/decrypt information in the system, namely the system administrator/beneficiary and the user(s) who add(s) information to the system. The encryption mechanism is mainly intended to protect the information added by users but the administrator has the function of encryption/decryption to be able to intervene in the recovery of data that has been encrypted by a user, and the latter has lost his private encryption key or is not actually available to decrypt to a request for access to information initiated by another user. The mechanism of user demand-based access to information, is described in detail in Chapter 3.3.11

The key pair consisting of the public key and the private key, which belongs to the administrator is called the MASTER key pair. The MASTER private key is divided into several pieces, so that it cannot be rebuilt unless several administrators are present in the urgent decryption process. The purpose of this functionality is to show confidence in the beneficiary of the system, which although can decrypt information in an emergency situation, this procedure can only be done in a controlled environment, with several administrators present and with all the steps performed in this operation logged in to an immutable log system. The private key is divided into N pieces (configurable) and K pieces are needed to rebuild the key (where K<=N). The algorithm used to share the private key is called "Shamir's Secret Sharing" and its explanation is not the purpose of this document but more details about this algorithm can be viewed at this link https://en.wikipedia.org/wiki/Shamir%27s_Secret_Sharing. Each piece of the MASTER private key that is in the administration of an administrator is in turn encrypted with its own pair of asymmetric keys, to prevent an administrator from seeing in the system the piece of the MASTER private key that belongs to another administrator. As it is configurable, one can choose an asymmetric administrator key to be a hardware key, an external device, or to be stored in the security subnet and generated based on the administrator's username and password.

HyperFiuse users are created with a pair of asymmetric keys, and they will use the public key for encryption and the private key for decryption. The public key is available and visible to all users in the system, but the private key is secret and belongs to each user. A user's private key is protected by HyperFiuse through 3 different mechanisms, namely: external hardware device that stores the private key and is in the user's possession, keeping the private key by the user in digital string format or the less secure version, in which the keys are stored in the security subnet and managed by the system. The third version in which private keys are managed by the system are intended for software products that do not have users ready to protect a private key and emphasize other features offered by HyperFiuse or make confidence to the beneficiaries of the platform, from the fact that they can provide the necessary protection of these keys in relation to other parties.

The encryption of the information that is saved in the database is done at the request of the system users. They can configure the system to store certain records in the encrypted database. It can also be that certain fields in a record (e.g. only the surname and name field in a table with the surname, name and date of birth fields) are encrypted, the rest of them to be stored clearly, in the form in which they were entered by the user. The choice of fields in an entity (table) to be stored encrypted is at the discretion of the beneficiary, and it is his option to manage the amount of information that is encrypted in relation to the performance expected from the system, given that it is well known that the encryption and decryption process can reduce information access performance.

The information that is encrypted before storage is encrypted with two public keys, the user key that enters the data and the MASTER key that is used for decryption in case of emergency. The system can be configured not to use a MASTER key, and data recovery can only be done based on the user's private key, but this will be done knowingly with the statement that if a user loses his private key, it is possible that encrypted data can never be recovered.

The programmer who interacts with HyperFiuse through the API will never worry about the encryption/decryption process, the keys associated with the process being generated in time, and he will always send the information in the original unencrypted format and extract it from the system in the same format. The process of encryption, encrypted storage and decryption is performed by HyperFiuse in the internal mechanisms, the programmers being exempted from the effort to process these operations.

3.3.9 Data Decryption

Data decryption in HyperFiuse takes place following a request to view data from a user, in the context in which the data has been stored encrypted in the database. This decryption is done with the private key of the user who entered the data and who is the owner of that data. Decryption can also be done by the system administrator with the MASTER key in special cases when the user has lost the private key or when the user cannot respond to an urgent request for data permission (e.g.: encrypted data is vital medical data and the user is even the owner of the private key in the position of not being able to provide access to them)

Data decryption is also invoked if access is requested based on a request made by another user. Data ownership does not completely restrict access to it, the data held can even be added to the system as public data or as private data. Public ones are accessed by all users and private ones cannot be accessed by any user other than the user who added them. But data can also be entered with the PERMISSIONED feature that allows other users to see that the data exists in the system, but they must request access. In this case, if the data owner user wishes to provide access, then another data decryption is performed with the data owner key and the data is made available to the user who has been granted read privileges.

The mechanism for encrypting and decrypting information entered by a user is optional, and is activated by the system administrator, the data infrastructure designer according to the logic of the software and the functional expectations of the software using the HyperFiuse platform.

3.3.10 Data Signing

A digital signature is a mathematical scheme used to demonstrate the authenticity of digital messages or documents. A valid digital signature provides the recipient with a solid basis to believe that the message was created by a known sender (authentication), to be sure that the sender cannot deny that he sent the message (non-repudiation), and that the message was not modified along the way (integrity).

Digital signatures are a standard element of most cryptographic protocol suites, and are commonly used for software distribution, financial transactions, contract management software, and in other cases where it is important to detect falsification or data manipulation. More information about the digital signature can be found at this link: https://ro.wikipedia.org/wiki/Semn%C4%83tur%C4%83 digital%C4%83

HyperFiuse uses the digital signature to sign transactions that are stored on the immutable chain in the blockchain. Each transaction is actually an operation of writing/modifying a record in the database, but the details of the operation that are saved in the blockchain (see details in Chapter 3.3.1) are digitally signed. The blockchain saves the transactions that are grouped in transaction blocks. Each transaction in the block is digitally signed with the keys of the user who added the data to the system, and each block is digitally signed with the keys of the node that confirmed the block of transactions.

3.3.11 Data Ownership and Data Access

Each HyperFiuse user is the owner of the information he enters into the system. This is confirmed by digital signatures (see Chapter 3.3.10) and by encryption of the information entered. There is indeed the possibility to not encrypt information, especially since valuable time is lost in decryption, but it is up to the system administrator to decide what information is sensitive and requires encryption to protect access to it and what information can be stored unencrypted as only the digital signature is sufficient to prove ownership of the information.

Encryption information stored in the database is an essential mechanism to protect user information. The mechanism for encryption/decryption explained in Chapters 3.3.8 and 3.3.9, is applied with the aim to protect data in the database, data that can be replicated on nodes managed by third parties, but also to protect access to data from other users. Records stored in the system labeled PERMISSIONED (see Chapter 3.3.9) are available to other users, who may see that the information exists, but accessing it requires an access permission request mechanism, permission finally granted by the user who owns the information. Records stored with the PRIVATE tag (see Chapter 3.3.9) can never be accessed through the access request mechanism, but an administrator will be able to view them directly in the database, and that information would must be stored encrypted if it is sensitive information.

Ownership of a user's data requires the user to participate in the data access request process (for records labeled PERMISSIONED) and it is useful to have the data stored encrypted if the information is to be shared with third parties based on an access request. This does not mean that the data can be distributed unencrypted, it will not be available through the API, but will be visible to a data administrator directly in the database. The field configuration mechanisms, in a collection or entity, that store encrypted information are managed by the system administrator. The data system architect will decide whether a record is stored fully encrypted in the database or only certain fields in that record will store the encrypted information. The PERMISSIONED tag is transmitted by the programmer who sends the information to the system, and each record sent for saving can have the PERMISSIONED, PRIVATE, or PUBLIC tag. The software system that communicates with HyperFiuse, based on the rules decided by the programmer, can send the information with one of the 3 labels regardless of how the table is configured and/or how many fields are encrypted or not.

When a record is fully encrypted, access can only be granted to certain fields in it. The user who requests access to a PERMISSIONED record, knows the structure of the table in which the information is encrypted, and can request access to the entire record or only to a few fields in it. The data owner may also grant access to all fields to which access has been requested or may decide which of the required fields to grant read permission to. Also, the access permission is granted for a limited period of time, the period of time decided by the data owner; at the expiration of this period of time the information can no longer be accessed, and a new access request is needed to obtain reading privileges again.

Throughout this process of requesting and granting access to data tagged as PERMISSIONED, no private decryption key is transferred; the information is decrypted with the data owner's key and then it is transmitted to the user who requested access, in clear unencrypted form through the API. The data owner may deny a data access request.

3.3.12 Data Visibility in the Blockchain

Any user has access to HyperFiuse data through the API. The API allows a user to interact with the system to add, modify and delete information as in any traditional database management system. The read operation is also done through the API and reading the information in a table returns the data block to which the user performing the read operation has access.

The operation of listing the information in a table can be performed with the information filtering parameter to which a user has access:

Listing information with the ALL ACCESSIBLE parameter: returns all information entered with the PUBLIC tag, all information entered with the PERMISSIONED parameter that belong to the user who performs the reading or other users who have given access to data to the user who performs the reading and all information entered with the PRIVATE tag by the user who performs the reading.

ALL parameter information listing: returns all information to which a user has access (the same as described above in the ALL ACCESSIBLE parameter listing) plus all information entered with the PERMISSIONED parameter by other users and to which reading permission has not been granted. This information will only be returned with the unique identifier of the record and the identifier of the user who is the data owner, without disclosing the contents of the record, and the unique identifier will be used by the user who makes the reading for a data access request.

Listing information with the ALL FORBIDDEN parameter: returns all information entered with the PERMIS- SIONED parameter by other users and for which reading permission has not been granted. This information will only be returned with the unique identifier of the record and the identifier of the user who is the data owner, without disclosing the contents of the record, and the unique identifier will be used by the user who makes the reading for a data access request.

Regardless of whether or not the information is encrypted in the database, the reading operation will return the list of requested records in clear, unencrypted form, the decryption process being performed automatically (based on permissions) by the HyperFiuse system, before being delivered to the user who performs the reading.

3.3.13 Reading with Confirmation of Data Integrity

The operation of the individual reading of a record, based on its unique identifier, can also be performed with a request to verify the integrity of data, to identify whether the information returned by the reading operation has not undergone unauthorized changes at the database level. The integrity check operation is optional, and if chosen, the result returned after requesting registration to the API will contain a field that has the logical value TRUE or FALSE (true/false) which will indicate exactly whether the information has been altered or not. It is up to the programmer or software system requesting the information to decide what actions can be deduced after reading, if information has been identified as unauthorized. The user who performed the reading may contact the data administrator and request further investigation or may request the system to reconstruct the information and return it to its original form (see Chapter 3.3.14).

Information is verified by calculating a hash of the data read from the database and comparing it with the hash corresponding to the registration in the blockchain. In the blockchain, the original hash is calculated and stored when entering data into the system. If the two hashes are different it means that the information has been changed in the database. We start from the assumption that the information in the blockchain cannot be modified, and its falsification involves the reconstruction of the entire immutable data chain on all nodes.

Whether or not the information is encrypted in the database, the reading will return the requested record in clear, unencrypted form, the decryption process being performed automatically (based on permissions) by the HyperFiuse system, before it is delivered to the user who perform the reading.

3.3.14 Reconstruction of Altered Data

The individual reading of a record, based on its unique identifier, can also be performed with a request to reconstruct the record. It is up to the programmer to decide whether to reconstruct an information if it has been identified as altered as to its original form. The programmer or software system that operates the reading may request the reconstruction of the recording regardless of any changes thereto. The option to reconstruct the data can be invoked at any reading of the information.

The reconstruction mechanism, once invoked, will look for an unaltered version of the record on the data node where the information was added or on a FULL NODE in the network. The reconstruction mechanism is designed to provide fast options for data recovery and to provide a superior guarantee of data immutability and increased data resistance to unauthorized changes.

Whether or not the information is encrypted in the database, the reading will return the requested record in clear, unencrypted form, the decryption process being performed automatically (based on permissions) by the HyperFiuse system, before it is delivered to the user who perform the reading.

3.3.15 Data Versioning Mechanism

All data stored in HyperFiuse are kept together with all the history of their changes. Any table/collection created in HyperFiuse has a correspondent in the database no matter what database engine is used. In addition to this table, a history table is created that will store all previous versions of a record. Specifically, in the table in the database we will always have the latest version of a record and in the associated history table we will have all previous versions of the record.

Historical versions of a record are also immutable, i.e. they can be checked with the original hash stored in the blockchain, and the integrity check mechanism (see Chapter 3.3.13) and the data reconstruction mechanism (see Chapter 3.3.14) also applies to historical data.

The reading of an individual record, based on its unique identifier, can also be performed with a request to view a historical version of a record. Any reading also returns with the requested data the maximum version of the record (integer from 1 to n where n is the latest version). Based on this maximum version number, the programmer can request any version from the 1st interval of the respective record so that HyperFiuse will know what kind of information is requested and will return the data from the main table or from the history table.

3.3.16 Data Recovery Mechanism (Real-Time Backup)

HyperFiuse replaces the classic backup mechanism by copying the entire database (snapshot) and eliminates the problems of data loss that is written to the database from the moment the last copy was created until the destruction of the database. In addition to these risks, full snapshot backup also requires a lot of disk space, as the more frequent the copies, the more space is consumed.

HyperFiuse stores data in its entirety on each FULL NODE (see Chapter 3.3.7), and each time a FULL NODE data node is added to a subnet, it begins to synchronize and bring all database and blockchain data. The process takes a period of time directly proportional to the amount of data stored. The created node exposes through the API all the functionalities through which the software product can interact with HyperFiuse to be fully operational. A lost or damaged node to which a software product connects can be easily rebuilt and in the meantime the software product can connect to any other FULL NODE on the network.

This mechanism does not require any full snapshot copying, on the contrary, it requires 2-3 FULL NODE to ensure the maximum security needed to ensure that a system can be operational and 100% available, compared to a classic back-up that makes at least 2-3 full copies every day.

3.3.17 Alert and Notification Mechanism

Operations recorded in HyperFiuse can be monitored by the system administrator, and alerts and notifications can be defined for each interaction of writing, reading, deleting or updating a record. The alert and notification mechanism is defined as "the time of occurrence of an event—(WHEN)" and "the activity to be performed when an event occurs— (WHAT)".

The events that can be monitored in HyperFiuse are detailed in the following table (WHEN):
Writing: INSERT
Event: BEFORE
Description: An alert can be generated before inserting a record
Writing: INSERT Event: AFTER
Description: An alert will be generated after inserting an event in the system.
Writing: UPDATE
Event: BEFORE
Description: An alert can be generated before updating a record
Writing: UPDATE
Event: AFTER
Description: An alert will be generated after updating an event in the system.
Writing: DELETE
Event: BEFORE
Description: An alert can be generated before deleting a record
Writing: DELETE
Event: AFTER
Description: An alert will be generated after deleting an event in the system.
Writing: UPDATE-ID
Event: BEFORE
Description: An alert can be generated before a specific record is updated, an alert that will not be generated unless the unique identifier record specified by the administrator is updated.
Writing: UPDATE-ID
Event: AFTER
Description: After updating a certain event in the system, an alert will be generated, an alert that will not be generated unless the registration with the unique identifier specified by the administrator is updated.
Writing: DELETE-ID
Event: BEFORE
Description: An alert can be generated before deleting a particular record, an alert that will not be generated unless the record with the unique identifier specified by the administrator is deleted.
Writing: DELETE-ID
Event: AFTER
Description: An alert will be generated after deleting an event in the system, an alert that will not be generated unless the registration with the unique identifier specified by the administrator is deleted.

Each alert generated by the system following the events defined in the table above, can be operated in several ways as follows (WHAT):

Processing type: Stored Procedure
Parameter: Registration performed
Description: A stored procedure-type smart contract (see Chapter 3.3.19) is executed at each event. The altered record will be sent as a parameter and the stored procedure will act according to the instructions in the smart contract as created by the programmer.

Processing type: Web messages
Parameter: Registration performed
Description: At each event, a POST web request will be executed, whose parameter is the altered registration and details about the type of event that registered the alert. It will be up to the program that will intercept the request to determine what to do next with the information received.

Processing type: System notification
Parameter: Registration performed
Description: Each event will add a record to the system notification table, which will contain details about the type of event that generated the alert, the altered record, and the user who initiated the write operation. The system administrator will notice these alerts in the system administration application.

Processing type: Email
Parameter: Registration performed
Description: Each event will send an email with details about the type of event that generated the alert, the altered registration and the user who initiated the write operation. The email will only be sent if the system is configured with the SMTP details required to send emails from the system, 3.3.18 Licensing Nodes HyperFiuse is a system created to serve companies that develop software solutions on blockchain technology, companies that will build their solutions on a private network. Specifically, the nodes that are part of the HyperFiuse network will belong to a client, beneficiary; although he will manage the entire system, certain nodes might run on third parties. For this reason, but also to avoid the introduction of a node in the network by unauthorized persons, it is necessary to have a node licensing mechanism, a mechanism that allows the creation of new nodes, but at the same time this process needs to be supervised, approved and controlled by the final beneficiary of the system.

Node licensing protects the beneficiary from adding unapproved nodes to the system, which can be used to extract information by unauthorized third parties. If this protection is not required in public blockchain solutions, in HyperFiuse it is desired that no node that is part of the network be started without the final approval of the system beneficiary.

There are two procedures to follow to start a HyperFiuse network: the procedure to start the original node or the first node and the procedure to add other nodes to an already created network. The procedure for starting or creating the initial node has the following steps:

1. The initial node is started and the unique node name/identifier is given as the start parameter.
2. The /license/generateLicenseKeys function with validity and startDate parameters is called through the API, to create a license that comes in the form of a public/private key pair. The validity parameter refers to the period of validity of the license and the startDate parameter refers to the date on which the license takes effect. The API generates and stores the license in the system and returns the saved record with its unique identifier.
3. The /license/createNode function with nodeId, licenseId, and nodeType parameters is called through the API to create a configuration that associates the initial node with the license created in the previous step. The nodeId parameter is loaded with the node name/unique identifier, the licenseId parameter is loaded with the unique license identifier that was generated in step 2, and the nodeType parameter specifies the type of node that is being created (data node or authorization node—for more details see Chapter 3.2). The API associates the created license with the started node and returns the stored record for confirmation.
4. Download the license generated in step 2 through the API Interface function /license/download/{nodeName} Parameter nodeName contains the name of the created node/its unique identifier.
5. Copy the downloaded license file to the original node in the folder specific to storing the license files
6. The /license/applyConfiguration function that generates the node token that is used further from the initial node in communicating with the other nodes in the network (in the form of an API key) is called through the API.

The procedure for adding a new node to the network is as follows:
1. The /license/generateLicenseKeys function with validity and startDate parameters is called through the API, to create a license that comes in the form of a public/private key pair. The validity parameter refers to the period of validity of the license and the startDate parameter refers to the date on which the license takes effect. The API generates and stores the license in the system and returns the saved record with its unique identifier.
2. The /license/createNode function with the nodeId, licenseId, and nodeType parameters is called through the API to create a configuration that associates the new node with the license created in the previous step.

The nodeId parameter is uploaded with the node name/unique identifier, the licenseId parameter is uploaded with the unique license identifier that was generated in step 1, and the nodeType parameter specifies the type of node that is being created (data node or authorization node—for more details see Chapter 3.2). The API associates the created license with the new node and returns the stored record for confirmation.
3. Download the license generated in step 1 via the API function /license/download/{nodeName} nodeName Parameter contains the name of the newly created node/its unique identifier.
4. Copy the downloaded license file to the newly created node in the license file storage folder
5. The new node created with the start parameter is started, the name of the node/its unique identifier chosen by the operator in step 2. When the node is started, a token specific to the newly created node is automatically generated, which it will use in communicating with other nodes in the HyperFiuse network (API secret key)

The defined mechanisms aim at clarifying that there is a licensing mechanism under which a node can be associated with a HyperFiuse network, clarifying the procedure by which this licensing mechanism is activated together with starting and adding a new node, and clarifying that communication between network nodes is done through the TCP protocol and only based on a secret API key that is associated with the operating license of each node.

3.3.19 Smart Contracts

Smart contracts are software sequences (software programs) that a programmer can attach or add to the HyperFiuse system. These programs aim to extend the existing functionalities of the platform, allowing the programmer or beneficiary to add new functions in addition to the standard features that are available at installation. Smart contracts are also highlighted by the fact that they are stored in the blockchain, and the source code that defines them becomes immutable, giving the beneficiary or third parties interacting with the HyperFiuse system, the guarantee that certain features cannot be changed even by the platform beneficiary.

The development of smart contracts is available to any programmer who has an instance of HyperFiuse, the source code of the smart contract is owned by the developer, who is free to sell or make available for free the functionality created. However, the mechanism and execution environment of smart contracts, i.e. the HyperFiuse platform is and will remain the intellectual property of Ingenium Blockchain Technologies, the creator of HyperFiuse. Also, in order to create a smart contract, the programmer must follow the development procedures provided by Ingenium Blockchain Technologies, as well as the auxiliary libraries and/or platforms that facilitate these developments.

HyperFiuse is a smart contract execution environment, and through a smart contract, the programmer can interact with several existing components/functionalities such as Encryption/Decryption, checking the integrity of a record and so on. When developing a smart contract, the programmer needs the communication interfaces with the existing functionalities, even if they are not in a HyperFiuse execution environment. Basically, through the libraries provided by Ingenium Blockchain Technologies, a programmer can use a Java development environment to create smart contracts, without necessarily having a functional HyperFiuse system. Indeed, to test the developed contract, a test environment or a HyperFiuse instance will be required in order to run the created functionality. These libraries with HyperFiuse interaction interfaces are available for download for any programmer who wants to develop smart contracts.

Smart contracts are developed on the personal computer by programmers, and once completed they can be uploaded and activated in the HyperFiuse system. The source code of a smart contract will be in Java archive format (*.jar), and may contain program sources, their attachment to the archive being strictly at the discretion of the programmer. The smart contract is uploaded to HyperFiuse via the administration interface by the system administrator or the programmer, depending on its access rights. Once a smart contract is uploaded, HyperFiuse will store the contents of the archive as well as its components and generate the signature calculated by a hash function of any file that makes up the uploaded archive. All signatures associated with the files that make up the smart contract archive, together with the upload operation itself, are stored on the blockchain (immutable chain) to allow checking the integrity of the functionalities that the smart contract exposes at any time, and to guarantee system users that the code to be executed has not been altered.

The data distribution mechanism (see Chapter 3.3.2) will help the smart contract uploaded in the system to be distributed and uploaded on all data nodes in the network, so that the functionality that the smart contract exposes is available throughout the system. This process is also of great help in the code propagation mechanisms and new functionalities in a system in production.

A smart contract is also subject to the versioning mechanism of HyperFiuse, a mechanism that allows a programmer to make improvements to a smart contract, uploading new versions of the contract and allowing the running and execution of a smart contract with version parameter. The programmer or system administrator can also opt for the cancellation of a smart contract version, for situations where the new versions are critical or one no longer wants to expose certain functionalities.

A smart contract is uploaded into the HyperFiuse system and upon publication it receives a unique id in response to a correctly performed upload operation. Uploading a smart contract may fail in the case of source code errors or in the case of running certain security tests without a positive result. The list of contracts published by a user, generally an administrator who has the right to upload a smart contract, is available in the system administration application. Each smart contract available in the list of uploaded contracts can be operated by the administrator as follows:
  enable/disable—the smart contract once loaded is not active, functionally available until it is activated by the administrator. Disabling a smart contract puts the contract in a state where it can no longer be accessed by users, and the contract becomes non-functional deletion—the smart contract is canceled and can no longer be called by any user. The operation is irreversible update—a new version of the smart contract is uploaded history check—check the history of users' calls to the smart contract. The history is in the form of an immutable log detailing user calls and includes information such as the method in the contract called, call parameters, the user who called the contract, the date and time of the event, any errors and logs specified by the programmer within the contract.

activation/deactivation of smart contract login system definition of smart contract as a recurring activity with global parameters (date, time, etc.)—applies only to smart contracts such as stored procedure specification of the user on whose behalf the smart contract is executed—applies only to smart contracts such as stored procedure Smart contracts are of several types and are differentiated by the nature in which they are executed. We have smart API contracts and smart stored procedure contracts.

Smart API contracts are such contracts whose functionality is accessed directly by the programmer through the API. A smart contract is called through the API, through a general API, which takes as parameters in the URL the unique identifier of the contract, the version of the contract and the method of the contract being called. The web API request is of POST type and parameters of the called method are transmitted in JSON format in the content of the request. The response to the web request to call a smart contract method can be of any nature specific to a POST request: JSON, text, HTML, file download etc.

Stored procedure smart contracts are contracts that cannot be called directly by the programmer through the API but can be called by the alert mechanism or other smart contracts. Their purpose is to facilitate functionality within HyperFiuse, which can be reused by other contracts or called by HyperFiuse internal processes (such as the alert mechanism that can call a smart contract after an event). Calling a method from a stored procedure smart contract returns the result at the time of execution, and the associated logs can be viewed by the administrator in the administration interface. Smart stored procedure contracts can also be defined by the administrator as recurring activities, processes that are performed regularly and perform certain operations at regular intervals.

A smart contract, once loaded into the HyperFiuse system, can be instructed by the programmer who created it to perform at least the following operations:

can operate on any entity/data table. The operation of an entity refers to changing its structure or data manipulation (read, add, update and delete)

can perform data integrity verification operations can perform data recovery operations can perform data encryption/decryption operations can perform digital data signing operations can access different versions of the data can request data access and can provide data access can call stored procedure smart contracts can access services displayed by HyperFiuse: sending emails, generating notification alerts, writing logs, etc.

can access the functionality libraries provided by HyperFiuse: libraries for validating input parameters, libraries for mathematical calculations, libraries for text formatting can access external web services can access any functionality provided by the Java programming language, at the security level applied by the platform administrator All methods in a smart contract will be executed on behalf of a system user, and all security restrictions, and access rights that he has, will be applied during the execution of the method in the contract. The user calling the smart contract is the user whose access rights will be applied. For certain recurring stored procedures, execution can be configured on behalf of a specific user or system user (administrator)

3.3.20 GraphQL

GraphQL is an open-source language for querying data obtained through API and an environment for manipulating the same. The language was developed in 2012 by Facebook for internal use, and was made public in 2015. GraphQL is also an API that allows much more complex data manipulation operations, with APIs that are limited by the operations they make available to programmers.

HyperFiuse exposes through the API the primary operations of interaction with the data saved in the system: data creation, data update, data deletion and data reading. With the help of GraphQL, the HyperFiuse API provides the programmer with the ability to create complex queries with this data in an easier and more efficient way.

GraphQL is not the property of HyperFiuse, it is just an open-source component that it uses, the only thing to remember in this context is that HyperFiuse, with the help of GraphQL, gives the programmer the ability to run complex queries through the REST API.

The invention has been mainly described above with reference to some embodiments. However, as is readily appreciated by a person skilled in the art, other embodiments than those disclosed above are equally possible within the scope of the invention, as defined by the attached claims.

The invention claimed is:

1. A computing system comprising:
two networks of nodes, wherein a first network of nodes of the two networks of nodes stores one or more access policies to a second network of nodes, wherein the second network of nodes of the two networks of nodes is configured to, based on a database and a blockchain, store and distribute data across nodes in the second network of nodes, wherein the two networks of nodes are in communication with each other via a communication channel, and wherein each node of the second network of nodes stores software that, when executed, causes the node to:
receive data for storing in the database;
cause the received data to be stored, based on an identifier associated with the received data, at a location in the database;
calculate, using a hashing algorithm, a fingerprint of the received data;
cause a transaction to be stored to the blockchain, wherein the transaction includes an identifier for the transaction, an indication of the location in the database, the identifier associated with the received data, and the fingerprint;
based on the transaction being stored to the blockchain, receive, from each other node of the second network of nodes, a request for the received data, resulting in a plurality of requests for the received data; and
send, to each other node of the second network of nodes, the received data to cause the received data to be stored in a copy of the database local to each other node of the second network of nodes.

2. The computing system of claim 1, wherein causing the received data to be stored in the copy of the database local to each other node of the second network of nodes includes causing the received data to be stored based on a type of the transaction being a create transaction, and wherein each node of the second network of nodes stores software that, when executed, causes the node to:
receive input indicating a modification to previously-stored data;
cause, for the modification to the previously-stored data, a new transaction to be stored to the blockchain;
based on the new transaction being stored to the blockchain, receive, from each other node of the second network of nodes, a request for the modification to the previously-stored data, resulting in a plurality of requests for the modification to the previously-stored data; and
send, to each other node of the second network of nodes, the modification to the previously-stored data to cause the copy of the database local to each other node of the second network of nodes to be updated based on the modification to the previously-stored data and based on the type of the new transaction being a modification transaction.

3. The computing system of claim 1, wherein each node of the second network of nodes stores software that, when executed, causes the node to: enable access to the requested data stored in the database via an applications programming interface (API) that is configured to return requested data to the node in a decrypted format, filter the requested data according to user rights associated with the node, perform data integrity checks on the requested data, and allow a data reconstruction option for the requested data if unauthorized changes have been identified.

4. The computing system of claim 1, wherein the database comprises tables or collections, and wherein each node of the second network of nodes stores software that, when executed, causes the node to:
configure the node to, based on one or more data synchronization policies, limit data synchronization to a subset of the tables or the collections, wherein the one or more data synchronization policies specifies which of the tables or the collections to leave unsynchronized with external nodes outside the second network of nodes.

5. The computing system of claim 1, wherein each node of the second network of nodes stores software that, when executed, causes the node to: configure the node to not allow data synchronization with each other nodes in the second network of nodes such that the copy of the database local to the node does not include any data entered via an applications programming interface (API) installed on each other node of the second network of nodes.

6. The computing system of claim 1, wherein each node of the second network of nodes stores software that, when executed, causes the node to:
encrypt the received data by a key pair consisting of a public key and a private key, the private key being protected by at least one of the following:
a first variant in which an external hardware device stores the private key and is in a user's possession,
a second variant in which the private key is managed by the user in a digital string format, and
a third variant in which the private key is managed by the first network of nodes.

7. The platform according to claim 1, wherein each node of the second network of nodes stores software that, when executed, causes the node to:
based on supervision, approval and control of a platform user of the first network of nodes, create the node as a new node in the second network of nodes.

8. A method comprising:
storing, by a first network of nodes, one or more access policies to a second network of nodes that is in communication with the first network of nodes via a communication channel, wherein the second network of nodes is configured to, based on a database and a blockchain, store and distribute data across nodes in the second network of nodes;
receiving, by a node of the second network of nodes, data for storing in the database;
causing, by the node, the received data to be stored, based on an identifier associated with the received data, at a location in the database;
calculating, by the node and using a hashing algorithm, a fingerprint of the received data;
causing, by the node, a transaction to be stored to the blockchain, wherein the transaction includes an identifier for the transaction, an indication of the location in the database, the identifier associated with the received data, and the fingerprint;
based on the transaction being stored to the blockchain, receiving, by the node and from each other node of the second network of nodes, a request for the received data, resulting in a plurality of requests for the received data; and
sending, by the node and to each other node of the second network of nodes, the received data to cause the received data to be stored in a copy of the database local to each other node of the second network of nodes.

9. The method of claim 8, wherein causing the received data to be stored in the copy of the database local to each other node of the second network of nodes includes causing the received data to be stored based on a type of the transaction being a create transaction, and wherein the method further comprises:
receiving, by the node, input indicating a modification to previously-stored data;
causing, by the node and for the modification to the previously-stored data, a new transaction to be stored to the blockchain;
based on the new transaction being stored to the blockchain, receiving, by the node and from each other node of the second network of nodes, a request for the modification to the previously-stored data, resulting in a plurality of requests for the modification to the previously-stored data; and
sending, by the node and to each other node of the second network of nodes, the modification to the previously-stored data to cause the copy of the database local to each other node of the second network of nodes to be updated based on the modification to the previously-stored data and based on the type of the new transaction being a modification transaction.

10. The method of claim 8, further comprising:
enabling access to requested data stored in the database via an applications programming interface (API) that is configured to return the requested data to the node in a decrypted format, filter the requested data according to user rights associated with the node, perform data integrity checks on the requested data, and allow a data reconstruction option if unauthorized changes have been identified.

11. The method of claim 8, wherein the database comprises tables or collections, and wherein the method further comprises:
configuring the node to, based on one or more data synchronization policies, limit data synchronization to a subset of the tables or the collections, wherein the data synchronization policies specify which of the tables or the collections to leave unsynchronized with external nodes outside the second network of nodes.

12. The method of claim 8, further comprising:
configuring the node such that the copy of the database local to the node does not include any data entered via an applications programming interface (API) installed on each other node of the second network of nodes.

13. The method of claim 8, further comprising:
encrypting the received data by a key pair consisting of a public key and a private key, the private key being protected by at least one of the following:
a first variant in which an external hardware device stores the private key and is in a user's possession,
a second variant in which the private key is managed by the user in a digital string format, and
a third variant in which the private key is managed by the first network of nodes.

14. The method according to claim 8, further comprising based on supervision, approval and control of a platform user of the first network of nodes, creating the node as a new node in the second network of nodes.

15. The method according to claim 8, further comprising starting or creating an initial node of the second network of nodes by at least:
starting the initial node and setting as a starting parameter a unique name/identifier of the initial node;
calling, through an applications programming interface (API) a /license/generateLicenseKeys function with validity and startDate parameters, to create a license that comes in the form of a public/private key pair;
calling through the API, a /license/createNode function with nodeId, licenseId and nodeType parameters, in order to create a configuration that associates the initial node with the license;
downloading the license, via the API, based on a /license/download/{nodeName} function;
copying the license to an original node and into a folder specific to storing licenses; and
calling, through the API, a /license/applyConfiguration function that generates a node token that is further used by the initial node in communicating with other nodes in the network.

16. The method of claim 8, further comprising adding a new node to the second network of nodes by at least:
calling through an applications programming interface (API), a /license/generateLicenseKeys function with validity and startDate parameters, in order to create a license that comes in the form of a public/private key pair;
calling through the API, a /license/createNode function with nodeId, licenseId and nodeType parameters, in order to create a configuration that associates the new node with the license;
downloading the license, via the API, based on a /license/download/{nodeName} function;
copying the license to the new node and into a folder specific to storing licenses; and starting, based on the configuration, the new node created with a start parameter and either a name chosen by an operator or a unique identifier chosen by the operator.

17. The method of claim 8, wherein the location in the database comprises a first table or a first collection;
wherein the first table or the first collection is configured to store a latest version of stored data; and
wherein the database comprises one or more second tables or one or more second collections;
wherein the one or more second tables or the one or more second collections is configured to store a historical record of previous versions of the stored data.

18. The method of claim 8, wherein causing the received data to be stored in the copy of the database local to each other node of the second network of nodes includes causing the received data to be stored based on a type of the transaction being a create transaction, and wherein the method further comprises:
receiving, by the node, input indicating a deletion of previously-stored data;
causing, by the node and for the deletion of the previously-stored data, a new transaction to be stored to the blockchain;
based on the new transaction being stored to the blockchain, receiving, by the node and from each other node of the second network of nodes, a request for the deletion of the previously-stored data, resulting in a plurality of requests for the deletion of the previously-stored data; and
sending, by the node and to each other node of the second network of nodes, the deletion of the previously-stored data to cause the copy of the database local to each other node of the second network of nodes to be updated based on the deletion of the previously-stored data and based on the type of the new transaction being a deletion transaction.

19. The method of claim 8, wherein the database comprises a relational database or a document-oriented database.

20. The method of claim 8 further comprising adding a new node to the second network of nodes by at least:
creating, based on license information stored by the first network of nodes, a license that comes in the form of a public/private key pair;
creating a configuration that associates the new node with the license;
causing the license to be copied by the new node and stored in a folder specific to storing licenses; and
starting, based on the configuration, the new node as part of the second network of nodes.

21. The method of claim 8 further comprising:
based on a third network of nodes being associated with a data synchronization policy indicating that the third network of nodes is not allowed to synchronize with the second network of nodes, blocking an access request, from any node in the second network of nodes, that requests access to the third network of nodes.

22. The method of claim 8, wherein the first network of nodes stores security keys of users associated with the second network of nodes, operating licenses for the second network of nodes, access policies, and information for the authentication and authorization of the users associated with the second network of nodes.

23. One or more non-transitory computer-readable media storing software code that, when executed, causes a computing system to:
store, by a first network of nodes, one or more access policies to a second network of nodes that is in communication with the first network of nodes via a communication channel, wherein the second network of nodes is configured to, based on a database and a blockchain, store and distribute data across nodes in the second network of nodes;

receive, by a node of the second network of nodes, data for storing in the database;

cause, by the node, the received data to be stored, based on an identifier associated with the received data, at a location in the database;

calculate, by the node and using a hashing algorithm, a fingerprint of the received data;

cause, by the node, a transaction to be stored to the blockchain, wherein the transaction includes an identifier for the transaction, an indication of the location in the database, the identifier associated with the received data, and the fingerprint;

based on the transaction being stored to the blockchain, receive, by the node and from each other node of the second network of nodes, a request for the received data, resulting in a plurality of requests for the received data; and send, by the node and to each other node of the second network of nodes, the received data to cause the received data to be stored in a copy of the database local to each other node of the second network of nodes.

24. The one or more non-transitory computer-readable media of claim 23, wherein causing the received data to be stored in the copy of the database local to each other node of the second network of nodes includes causing the received data to be stored based on a type of the transaction being a create transaction, and wherein the software code, when executed, causes the computing system to:

receive, by the node, input indicating a modification to previously-stored data;

cause, by the node and for the modification to the previously-stored data, a new transaction to be stored to the blockchain;

based on the new transaction being stored to the blockchain, receive, by the node and from each other node of the second network of nodes, a request for the modification to the previously-stored data, resulting in a plurality of requests for the modification to the previously-stored data; and send, by the node and to each other node of the second network of nodes, the modification to the previously-stored data to cause the copy of the database local to each other node of the second network of nodes to be updated based on the modification to the previously-stored data and based on the type of the new transaction being a modification transaction.

25. The one or more non-transitory computer-readable media of claim 23, wherein the software code, when executed, causes the computing system to add a new node to the second network of nodes by at least:

creating, based on license information stored by the first network of nodes, a license that comes in the form of a public/private key pair;

creating a configuration that associates the new node with the license;

causing the license to be copied by the new node and stored in a folder specific to storing licenses; and starting, based on the configuration, the new node as part of the second network of nodes.

* * * * *